Patented May 14, 1929.

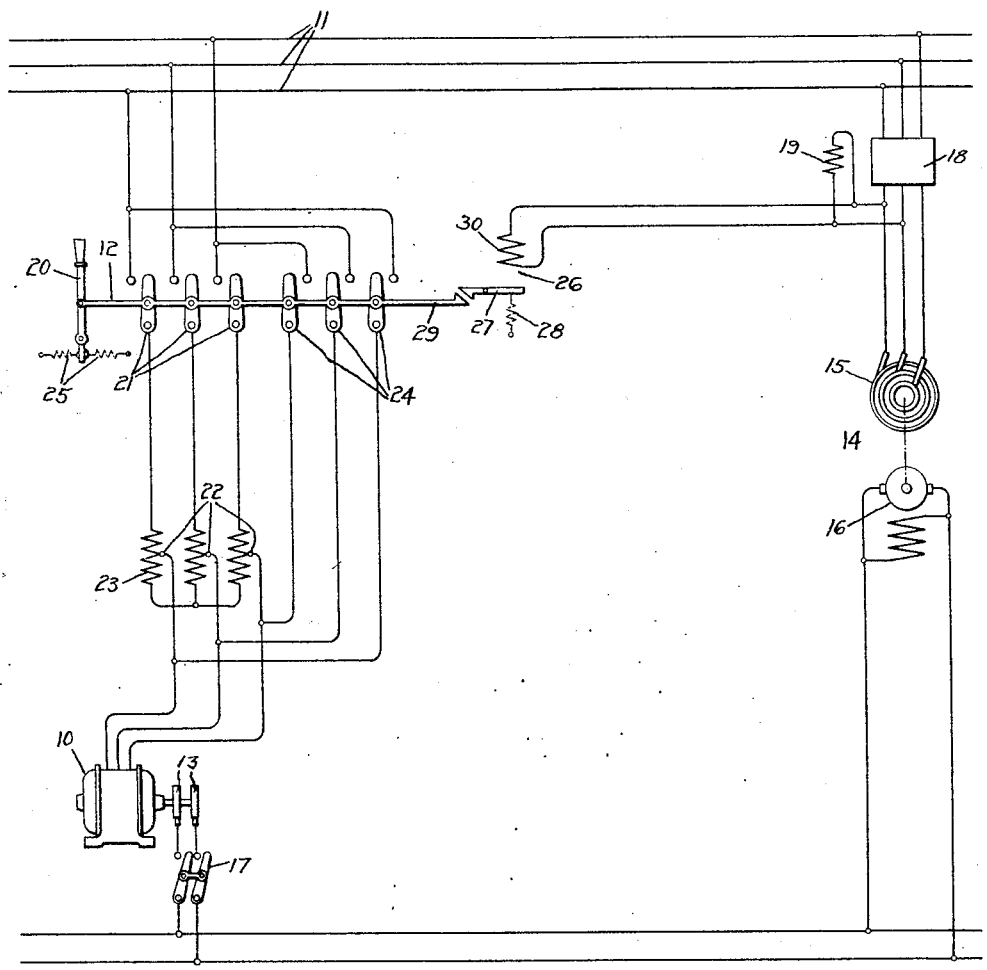

1,713,202

UNITED STATES PATENT OFFICE.

EARLE E. WARNER, OF SCHENECTADY, NEW YORK, ASSIGNOR TO GENERAL ELECTRIC COMPANY, A CORPORATION OF NEW YORK.

MOTOR-PROTECTIVE-SWITCHING APPARATUS.

Application filed July 1, 1925. Serial No. 40,969.

This invention relates to the protection of electric motors, particularly alternating current motors having separately excited field windings which may be deenergized automatically under certain conditions, and the principal object of the invention is to insure against continued operation of the motor with the field windings unexcited.

More specifically, the invention provides a novel arrangement of control apparatus and circuits whereby the line switch of an alternating current synchronous motor having a field winding excited through a rectifying device is opened automatically upon the opening of an automatic electroresponsive switch controlling the rectifying device.

Where the field winding of an alternating current synchronous motor is energized through a rectifying device such, for example, as a motor generator set, which is connected to the alternating current lines supplying power to the motor, it is desirable to prevent continued operation of the motor in case the motor generator set is disconnected from the alternating current supply lines. Ordinarily, both the motor line switch and the switch for connecting the motor generator set to the alternating current circuit are provided with automatic electroresponsive means for opening the switch in case the voltage of the alternating current supply lines decreases below a certain value. Should the electroresponsive means associated with the switch controlling the motor generator set respond to a momentary drop in the voltage of the alternating current supply lines which is insufficient to cause the motor line switch to open, it will be evident that the synchronous motor will be maintained connected to the supply lines with the field windings unexcited. This may result in overheating and seriously damaging the armature and amortisseur windings of the synchronous motor. In accordance with the present invention damage to the motor is effectively prevented by arranging the motor line switch so that it is automatically opened upon the opening of the undervoltage protective switch controlling the motor generator set.

In carrying the invention into effect in a preferred form of protective switching apparatus for an alternating current synchronous motor excited from a motor generator set, the synchronous motor line switch and also the line switch for the motor driving the exciter are suitably biased to the open position and are arranged to be held in the closed position by electroresponsive latch mechanism energized in accordance with the voltage of the alternating current supply lines. The electroresponsive latch mechanism for the synchronous motor line switch is connected to be energized responsively to the voltage impressed upon the alternating current driving motor of the exciter. Hence, when the motor of the exciter set is disconnected from the alternating current supply lines by operation of its automatic undervoltage protective switch, the undervoltage release mechanism of the synchronous motor line switch is deenergized at the same time, thereby causing the synchronous motor to be disconnected from the alternating current supply lines.

In the accompanying drawing the single figure diagrammatically illustrates the invention embodied in such a protective switching arrangement for an alternating current three phase synchronous motor.

Referring to the drawing, the alternating current synchronous motor 10 receives power from suitable alternating current supply lines 11 through the line switch mechanism 12. The motor 10 is shown as of the usual three phase type having the field winding thereof connected to be energized through two slip rings 13 mounted upon the motor shaft.

A suitable rectifying device, such as the motor generator set 14 composed of the alternating current motor 15 and the direct current generator 16, is provided for supplying unidirectional energizing current to the field winding of the motor 10 from the alternating current supply lines 11. A switch 17 controls the connection of the direct current generator 16 to the field winding of motor 10. The alternating current motor 15 of the motor generator set may be of the ordinary multiphase induction type as indicated in the drawing and is connected to the alternating current supply lines 11 by means of a suitable switch 18, which may be of any desired type affording automatic undervoltage and overload protection to the motor 15. Preferably the switch 18 is of the well known alternating current motor starting compensator type having a winding 19 energized in accordance with the voltage impressed upon the motor 15 and arranged to automatically open the switch 18 when the voltage decreases below a certain value.

In the arrangement shown the motor line switch 12 is of the double throw type. When the operating handle 20 is thrown to the left the motor 10 is energized from the supply lines 11 through the switch blades 21 and the low voltage taps 22 of the auto-transformer 23. Upon movement of the operating handle 20 to the right the motor 10 is connected directly to the supply lines through the switch blades 24. The line switch mechanism 12 is biased to the off position in which it is shown by suitable means, such as the springs 25, and is arranged to be held in its right hand position by an electro-responsive latch mechanism 26. As diagrammatically illustrated in the drawing, the latch mechanism 26 comprises the pivotally mounted latch 27 which is biased to the released position by the spring 28 and is held electromagnetically in latching relation with the operation arm 29 of switch 12 by the winding 30. Winding 30 is arranged to be energized in accordance with the voltage of the supply lines 11 and the voltage responsive latch mechanism 26 is arranged to release the switch 12 when the energizing voltage of the winding decreases below a predetermined value.

In order to insure the opening of the switch 12 to disconnect the motor 10 from the supply lines 11 when the field of motor 10 is deenergized due to the opening of the switch 18 and the resulting shutting down of the motor generator set 14, the winding 30 is connected to be energized in accordance with the voltage of the supply lines 11 only when the switch 18 is closed. In this way continued operation of the motor 10 is effectively prevented when the motor generator set 14 is shut down and the field winding of the motor 10 consequently is deenergized.

The operation of the protective switching apparatus embodying the invention is as follows. Before starting motor 10, the motor generator set 14 is connected to the supply lines 11 by operating the switch 18 to the closed position in which it is maintained under the control of the under-voltage responsive winding 19. Closure of switch 18 connects the motor 15 of the motor generator set to the supply lines 11 and at the same time energizes the under-voltage responsive winding 30. This insures that when the switch 12 is operated to the right to connect motor 10 directly to the supply lines 11 it will be automatically maintained in the right hand position under the control of winding 30. However, in order to start the motor 10 at reduced potential the operating handle 20 is first thrown to the left. As previously pointed out this connects the motor 10 to the supply lines 11 through the low potential taps 22 of the compensator 23. After the motor is started and accelerated to substantially full speed, preferably by means of suitable amortisseur or induction windings, the operating handle 20 is then thrown to the right to connect the motor 10 directly to the supply lines 11. Due to the fact that the voltage responsive winding 30 is energized, the latch 27 is maintained in latching relation with the switch arm 29 and serves to hold the switch 12 in its right hand position against its bias to the open position. After the motor 10 is connected directly to the supply lines 11, switch 17 is closed to energize the field winding of the motor from the direct current generator 16 for synchronous running operation of the motor.

If during running operation of motor 10 the voltage of the supply lines 11 should decrease below the value at which the under-voltage winding 19 operates to open the switch 18 thereby disconnecting the motor generator set from the alternating current supply lines, it will be evident that the under-voltage winding 30 also is deenergized. Upon the deenergization of the winding 30, the latch 27 is operated to release the switch 12 to return to the open position in accordance with its bias. Thus, continued operation of motor 10 is rendered impossible after the motor generator set 14 is shut down and the field winding of the motor 10 consequently is deenergized. Furthermore, the switch 18 must be closed to restart the motor generator set 14 before the line switch 12 of motor 10 will be held in the running position by the electroresponsive latch mechanism 26.

While I have illustrated and described the preferred manner in which the invention may be carried into effect, it will be understood that the apparatus shown may be modified without departing from the spirit and scope of my invention as set forth in the appended claims.

What I claim as new and desire to secure by Letters Patent of the United States, is:

1. The combination of an alternating current motor having a field winding, a rectifying device for supplying direct current to said field winding, and separately operable automatic electroresponsive switches, one for controlling the connection of the motor to an alternating current source, and another for controlling the connection of the rectifying device to the alternating current source, and each having an under-voltage operating winding connected to the alternating current side of the rectifying device for insuring the opening of the first switch when the second switch operates to disconnect the rectifying device from the source.

2. The combination of an alternating current motor having a field winding, a rectifying device for energizing said field winding with direct current, a switch for connecting the motor to an alternating current source, means responsive to the voltage of the source for maintaining the motor switch closed, a separate automatic electroresponsive switch for controlling the connection of the rectifying device to the alternating current source and thereby controlling the energization of the motor field winding, and connections between the alternating current side of the rectifying device and the said voltage responsive means whereby the voltage responsive means of the motor switch is deenergized when the rectifier is disconnected from the alternating current source.

3. The combination of an alternating current synchronous motor having a field winding, an alternating current to direct current rectifying device for energizing said field winding, a switch for connecting the motor to an alternating current source, a separately operable switch for connecting the rectifying device to the alternating current source, each of said switches having voltage responsive means for opening the switch when the voltage of the alternating current source decreases below predetermined values, and connections whereby the voltage responsive means of the motor switch is deenergized upon the opening of the switch controlling the rectifying device.

4. The combination of an alternating current synchronous motor having a field winding, a switch biased to the off position and operable to the closed position for connecting the motor to an alternating current source for operation thereof, undervoltage latch mechanism responsive to the voltage of the alternating current source for maintaining the motor switch in the closed position, a rectifying device for energizing the said field winding from the alternating current source, an automatic electroresponsive switch for controlling the connection of the said device to the alternating current source, and connections whereby the said voltage responsive latch mechanism is deenergized when the said automatic electroresponsive switch operates to disconnect the rectifying device from the alternating current source.

5. The combination of an alternating current synchronous motor having a direct current field winding, switch mechanism biased to the open position and operable to the closed position to connect the motor to an alternating current source for operation thereof, undervoltage latch mechanism for holding the motor switch in the closed position, a motor generator set for energizing the said field winding from the alternating current source, undervoltage responsive switch mechanism for controlling the connection of the motor generator set to the alternating current source, and connections whereby the undervoltage latch mechanism for the motor switch is energized in accordance with the voltage impressed upon the motor of the motor generator set.

In witness whereof, I have hereunto set my hand this 30th day of June 1925.

EARLE E. WARNER.